United States Patent [19]
Barlow

[11] Patent Number: 5,257,441
[45] Date of Patent: Nov. 2, 1993

[54] TRIPLE LOCKING SNAP HOOK

[75] Inventor: Chad Barlow, Pocola, Okla.

[73] Assignee: United States Forgecraft Corp., Fort Smith, Ark.

[21] Appl. No.: 939,464

[22] Filed: Sep. 2, 1992

[51] Int. Cl.⁵ .............................................. F16B 45/02
[52] U.S. Cl. .................................. 24/599.5; 24/600.1; 24/600.2
[58] Field of Search ................. 24/599.5, 599.4, 599.6, 24/599.7, 599.8, 600.1, 600.2

[56] References Cited

U.S. PATENT DOCUMENTS

| | | | |
|---|---|---|---|
| 1,660,927 | 2/1928 | Larsen | 24/600.2 |
| 1,879,168 | 9/1932 | Freysinger | 24/599.7 X |
| 2,490,931 | 12/1949 | Thompson | 24/599.7 X |
| 4,062,092 | 12/1977 | Tamada et al. | 24/599.7 X |
| 4,948,190 | 8/1990 | Lucas | 24/599.5 X |

*Primary Examiner*—James R. Brittain
*Attorney, Agent, or Firm*—Bernard A. Reiter

[57] ABSTRACT

A safety snap hook having a "J" shaped shank at one end and a hook at the other end in which there is a spring biased latch having one end pivotally mounted on said shank, and further including a pivoting detent mounted on the shank so as to be selectively engageable with a latch.

8 Claims, 1 Drawing Sheet

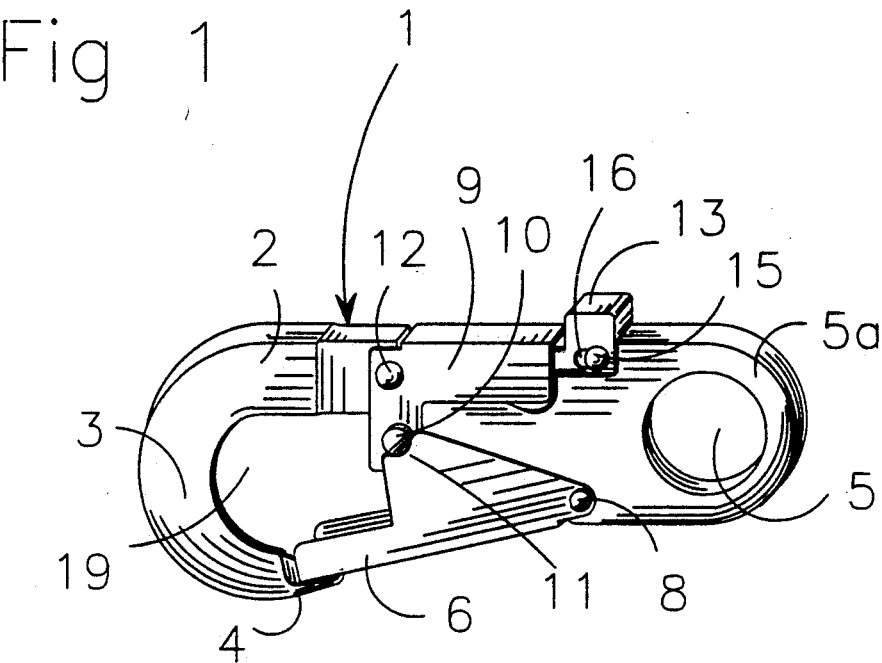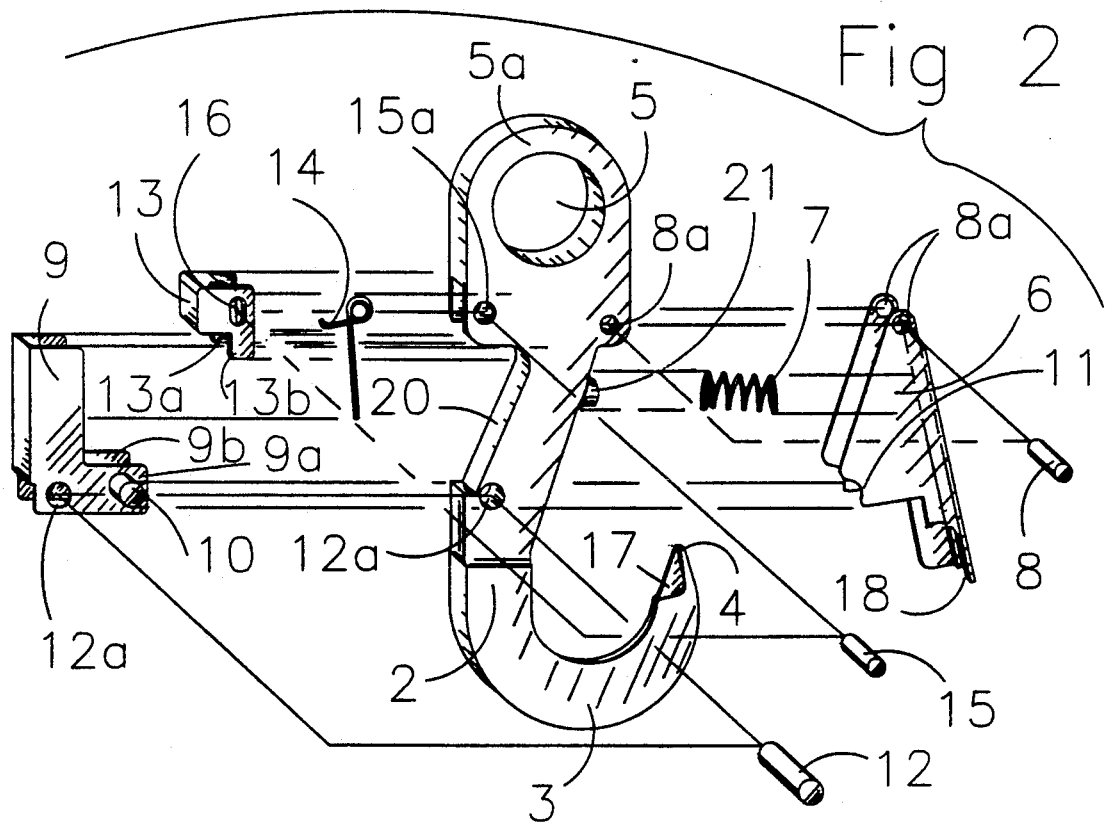

1

TRIPLE LOCKING SNAP HOOK

BACKGROUND OF THE INVENTION

1. Field of the Invention

The invention field relates to a locking snap hook that provides an anchoring device for retaining safety harnesses, load supports, lanyards, and the like. This particular device involves triple locking redundancy so as to create absolute safety during its use.

2. Prior Art

Heretofore, various locking redundancy devices of general interest have been conceived. All of these devices known to applicant have consisted of double locking mechanisms of various designs. No teaching to this inventor's knowledge has existed that teaches the concept of a triple locking snap hook of the particular design hereof. Current prior art in the field, for example, includes U.S. Pat. No. 1,879,168 to John B. Freysinger for the teaching of an invention relating to snap hooks having a hook shank provided with a throat, a pivoted spring-pressed latch for closing the throat, and means for locking the latch against accidental opening movement. The locking means is in the form of a lever "C" pivoted to the rear edge of the shank. Similar examples of such teachings are disclosed in a number of other patents such as U.S. Pat. No. 2,490,931 to Thompson for a self-locking linemen's body belt device; U.S. Pat. No. 3,831,994 to Robert Martin for a safety hook and U.S. Pat. No. 4,122,585 to Sharp, et al. for a single-action double-lock snap. Also, there is known U.S. Pat. No. 4,358,880 to Garcia for a quick release snap; U.S. Pat. No. 4,539,732 to Wolner for a double looking safety snap: and U.S. Pat. No. 4,977,647 to S. C. Casebolt for a double locking snap hook.

SUMMARY OF THE INVENTION

The subject invention is directed to a snap hook having multiple redundant protection that utilizes a total of three (3) safety catches which must be operated in specific predetermined sequence to open a snap lever or latch to insert a rope or to hook the device onto a rope. The latch is only opened when pressure or force is applied against the spring bias keeping the latch closed. However, a sliding detent must first be moved to the rear towards the connector ring of the device. This allows a second pivoting detent to pivot so that a pin head in the second detent will unseal from beneath the latch. Once this has been done, the latch can move into the opening against the bias spring. The triple looking device or snap hook may be used for any number of purposes. The invention may be used by linemen, window washers, and similar workmen for securing themselves against accidental falls. It is particularly well adapted for use by any person who is required to work at a distance above the ground. For example, a linemen for telephones, telegraph or electric light and power company, the snap hook hereof is fastened to a supporting belt or strap which, in turn, is connectable, by said hook, to a body belt worn by the linemen. The present invention provides single action, triple locking means permitting the hook to be readily releasable by one hand of the user.

The triple lock snap hook is disclosed herein with the principal objects of the device being to provide: a safety hook having a latch engageable by two separate detents for a triple locking function; a snap hook wherein the latch and the detents are movable sequentially such that the first detent releases the second detent which in turn releases the latch for the insertion of a connector ring of another snap hook, lanyard, or the like; a triple locking snap hook which is substantially safe from the accidental opening of the latch from a closed position to an open position; to provide a safety hook such that the sequential movement of the detents and the subsequent opening of the latch may be performed with a single hand; to provide a snap hook that is economical to manufacture, yet of durable construction such that the wear and tear from constant daily use will not deteriorate the quality and the safety of the device.

Other objects and advantages of this invention will become apparent from the description taken in connection with the accompanying drawings which are set forth, by way of illustration and example, the preferred embodiment of this invention.

BRIEF DESCRIPTION OF THE DRAWINGS

FIG. 1 is a perspective view of the triple lock snap hook of the invention, viewed from the front thereof.

FIG. 2 is the triple lock snap hook of the invention shown with the parts thereof exploded in relative relation to one another.

DETAILED DESCRIPTION OF THE INVENTION

This invention relates to devices commonly known as snap hooks 1 which are attached to hoist cables, lanyards, or the like, to engage cables or lanyards to a connector ring 5a. The single action snap hook 1 is provided with three (3) locking mechanisms to prevent the accidental disengagement of the snap hook 1 to thereby prevent injury to the user.

THE SHANK

Referring now to the drawings, the reference numeral 1 generally denotes the triple locking snap hook device. The snap hook 1 comprises a shank 2 or an arm defining the body of the snap hook 1. At one distal end, there is disclosed a hook 3 formed from the shank 2 being arched. The hook 3 ends with a tip 4 to define the J-shaped shank 2. At the other distal end, the shank 2 includes a connector ring 5a with an eyelet 5 formed therethrough which provides a means for attaching a lured support member, such as a lanyard or the like.

THE LATCH

The hook 3 and the tip 4 form the mouth 19 of the snap hook 1. The main locking mechanism for the snap hook consists of a locking arm or latch 6 which is pivotally engaged to the shank 2, at a proximate distal end opposite the hook 3 and is spring loaded to resiliently swing from the shank 2 to reach across the mouth 19 of the snap hook 1 and engage the tip 4 of the hook 3. The pivotal engagement of the latch 6 to the tip 4 is accomplished by a pivot pin 8. This spring biased latch 6 includes a bifurcated latch body with opposite sidewalls which straddle the shank 2. A biasing spring means 7 is contained within the latch body urging the latch 6 to a locking, engaging position at the tip 4 of the hook 5. The spring bias consists of a coil spring 7 affixed to a shank 2 with the help of a bead 21 and positioned to push against the latch 6 to thereby engage the latch 6 to the tip 4. The tip 4 is provided with a projection in the form of a ridge 17 and adapted to receive the latch 6 having a notch 18 at the distal end thereof at the point of engagement to thereby have an engaging relationship and to prevent the latch 6 from becoming disengaged when a harness, lanyard, or the like, accidentally exerts pressure in a direction transverse from the pivot direction. The ridge 17 on the tip 4 thus received along the notch of the latch creates means to substantially prevent undesired movement.

THE PIVOTING DETENT

The second locking mechanism of the present invention consists of a pivoting detent 9. This pivoting detent 9 is pivotally engaged and located directly opposite the latch 6 along the shank 2. The shank 2 has a detent notch 20 to thus allow pivotal movement of the pivoting detent 9. The pivoting detent 9 is generally of an L-shape with the pivot 12 located at the corner of the two arms 9a and 9b. Thus, as one depresses the longer arm 9b of the pivoting detent 9, the shorter arm 9a also pivots. The shorter arm 9a further has a pin head 10 located at its distal end. The pin head 10 engages with a notch 11 on the latch 6 to thereby secure the latch 6 from pivotal movement. The notch 11 shaped much like a parabola thus easily receives the pin head 10 located on the shorter arm 9a of the pivoting detent. The parabola further provides for a relatively easy movement or release of the pin head 10 from engagement with the latch 6 as the pivoting detent 9 pivots upon being depressed. The pivoting detent 9 is manufactured similar to the latch 6 in that the pivoting detent 9 includes a bifurcated body with opposed sidewalls which straddle the shank 2. It is held in place along the shank 2 with a pivot pin 12 extending through the pivoting detent 9 and the shank 2. Alternately, a torsional spring may also be included to keep the pivoting detent 9 engaged with the latch 6.

THE SLIDING DETENT

The pivoting detent's 9 movement is further restricted and controlled by the sliding detent 13. The sliding detent 13 comprises a bifurcated L-shaped body with opposing sidewalls which straddle the shank 2 and is held in place by a pivot pin 15 located at the corner of the arms 13a and 13b of the L-shaped body. The sliding detent 13 further has a slot 16 along one arm 13a of the L-shaped detent 13 beginning at the corner where the pivot pin 15 is located, allowing slidable movement along the shank 2. The sliding movement of the sliding detent 13 occurs along the length of the slot 16. The slot 16 is placed on one arm 13a such that the movement of the L-shaped body 13 occurs along the length of the shank 2.

Thus, when the sliding detent 13 and the pivoting detent 9 are engaged, no movement of the pivot detent 9 occurs since the sliding arm 13a with the slot 16 of the sliding detent 9 is received within the opposing sidewalls of the pivoting detent 9. As a result of the insertion or reception of one arm 13a of the L-shaped body 13 into the bifurcated body of the pivoting detent 9, the sliding detent 13 prevents and forecloses the depressing movement of the pivoting detent 9 until such sliding detent 13 is slidably exited or withdrawn from engagement allowing depression of the longer arm 9b of the pivoting detent 9. Even when the sliding detent 13 is disengaged from the pivoting detent 9, a torsional spring 14 remains engaged with the pivoting detent 9 preventing accidental pivoting movement. This torsional spring 14 keeps the pivoting detent 9 in a locked position with respect to a latch 6 by holding the pin head 10 engaged with the notch 11 on the latch 6. Thus, depression of the pivoting detent 9 and the depression of the latch 6 by its own pivoting movement at the application of sufficient pressure to overcome the reaction provided by the coil spring 7 the latch 6 is released from the tip 4 for insertion of a lanyard of the like. The torsional spring 14 is held in place by the same pivot pin 14 that holds the sliding detent 13 in place. The torsional spring 14 performs dual functions. One arm, as previously described retains the pivoting detent 9 in a looking position, while the other arm of the torsional spring 14 retains the sliding detent 13 in a locking position with respect to the pivoting detent 9.

SINGLE ACTION RELEASE

Thus, to operate the snap hook 1, the three locking mechanisms need to be activated in a sequential single action. The first action commences by sliding the sliding detent 13 which is then disengaged from the pivoting detent 9 allowing for a springing pivoting movement of the pivoting detent 9 when sufficient pressure is applied to overcome the torsional spring 14 force. When the pivoting detent 9 is thus depressed into the notch 20 along the length of the shank 2, the pin head 10 on the pivoting detent 9 slidably disengages from the parabolic notch 11 holding the latch 6 in a locked position. Upon the release of the pivoting detent 9 from engagement with the latch 6, the latch 6 is free for pivotal movement. The pivoting movement of the latch 6 may occur when sufficient force is applied to overcome the last remaining looking mechanism in the form of a coil spring 7. When the latch 6 is depressed sufficiently, a connector ring 5a of another snap hook 1 may be inserted or, in the alternative, a lanyard or the like may be hooked and placed in the mouth 19 for engagement. The unlocking of the triple locking snap hook may be accomplished by a single hand which makes this unique invention especially attractive.

The snap hook 1 is shown as a typical, flat unit of the type commonly used on safety equipment. It is normally made of forged steel to attain maximum strength for its size. The principles contained in this teaching may be employed to various sizes of snap hooks as is conventionally used. All pivots as disclosed in this invention show a rivet means, although all of the various fastening means such as brads and the like may be used.

As required, detailed embodiments of the present invention are disclosed herein. However, it is to be understood that the disclosed embodiments are merely exemplary of the invention which are embodied in various forms. Therefore, specific structural and functional details disclosed herein are not to be interpreted as limiting but merely as a basis for the claims and as a representative basis for the teaching to one skilled in the art to variously employ the present invention in virtually any appropriate detailed structure.

What is claimed is:
1. A safety snap hook comprising:
    a) a J-shaped shank having at one end thereof a hook including a tip extending therefrom defining a hook mount;
    b) load supporting means at the other end of said shank for attaching a load;
    c) a spring biased latch member having one end pivotally mounted on said shank and the other end free for selective engagement with said tip to close said hook mouth for a closed position, and to open said hook mouth for an open position;

d) a pivoting detent pivotally mounted on said shank so as to be selectively engageable with said latch member to thereby prevent said latch member from becoming disengaged from said tip during said closed position: and e) a spring biased slidable detent slidably mounted to said shank so as to be selectively engageable with said pivoting detent to thereby prevent said pivoting detent from pivoting movement during said closed position.

2. A safety snap hook of claim 1, wherein:

a) said latch member having a bifurcated latch body with opposite sidewalls and which straddle said shank;

b) said latch member having a biasing spring means contained within said bifurcated latch body urging said latch member to a locking, engaging position at said tip during said closed position; and c) said shank having a bead formation for holding said biasing spring means in place.

3. A safety snap hook of claim 1, wherein:
said tip having a ridge means adapted to receive said latch member having a notch at the point of engagement with said tip to thereby further strengthen the engagement between said latch member and said tip.

4. A safety snap hook of claim 1, wherein:
said latch member having a parabolic notch at the point of engagement with said pivoting detent to receivingly engage with a pin head located on said pivoting detent.

5. A safety snap hook of claim 4, wherein:
said pivoting detent having a biasing spring means to urge said pivoting detent in an engaging relationship with said latch member.

6. A safety snap hook of claim 5, wherein:

a) said slidable detent is of a generally L-shaped bifurcated body;

b) said L-shaped bifurcated body having a first arm and a second arm; and c) said second arm having a slot to slidably mount said slidable detent and to thereby provide means for sliding action for selective disengagement with said pivoting detent.

7. A safety snap hook of claim 1, wherein:

a) said slidable detent having a bifurcated body with opposite sidewalls and which straddle said shank; and b) said slidable detent having a biasing spring means contained with said bifurcated body urging said slidable detent to a locking, engaging position with said pivoting detent and to further prevent said pivoting detent from pivoting movement.

8. A safety snap hook comprising:

a) a J-shaped shank having at one end thereof a hook including a tip extending therefrom defining a hook mount;

b) a connector ring at the other end of said shank for attaching a load;

c) a spring biased latch member having one end pivotally mounted on said shank and the other end free for selective engagement with said tip to close said hook mouth for a closed position, and to open said hook mouth for an open position;

d) a pivoting detent pivotally mounted on said shank so as to be selectively engageable with said latch member to thereby prevent said latch member from becoming disengaged from said tip during said closed position; and e) a spring biased slidable detent slidably mounted to said shank so as to be selectively engageable with said pivoting detent to thereby prevent said pivoting detent from pivoting movement during said closed position.

* * * * *